Sept. 6, 1966          J. DE MENT          3,271,696
CHEMICALLY PUMPED LASER USING CHEMICAL
CARTRIDGE FOR LASER PUMPING Filed July 10, 1962          2 Sheets-Sheet 1

INVENTOR.

Jack DeMent

INVENTOR.

United States Patent Office 3,271,696
Patented Sept. 6, 1966

3,271,696
CHEMICALLY PUMPED LASER USING CHEMICAL CARTRIDGE FOR LASER PUMPING
Jack De Ment, 4847 SE. Division St., Portland, Oreg.
Filed July 10, 1962, Ser. No. 208,843
5 Claims. (Cl. 331—94.5)

This invention relates to a chemically pumped laser and to chemical cartridge for laser pumping In particular, to an energy transduction system and device whereby chemical energy is translated into coherent light; and more particularly to coherent light characterized as lying within the ultraviolet, visible and infrared regions of the electromagnetic spectrum which is generated by systems and devices in which the stimulated emission of radiation occurs. The term "lasers" is now commonly used to designate these systems and devices.

It is an object of this invention to provide a chemical energy-to-coherent light beam transducer.

It is another object of this invention to provide a laser light beam generator pumped or stimulated by light derived from chemical reaction.

It is an object of this invention to provide a laser light generator which is portable, storable, reloadable, and adapted to uses for and within preselected portions of the ultraviolet, visible and infrared regions of the spectrum.

An object of this invention is to provide a laser light beam generator for research, educational, therapeutic, and like applications. Another object is to provide communications, signalling, and like laser light beam generators.

A feature of my invention is a portable laser light beam apparatus which is reloadable with chemical energy pumping cartridges of designs adapted to the production of laser beams of varying pulses, intensities and wavelengths. A further feature is a portable laser generator which is reloadable with laser elements of substantially short lives.

A feature of this invention is its improved safety. That is, the high voltage of the capacitor of the electronic flash units used in conventional laser stimulators is capable of giving a fatal shock. In this invention no high voltages are employed and the design is such that safety is at a maximum.

Another feature is that a laser light beam generator is had whereby it can be stored for lengthy periods prior to use under field or emergency conditions. In addition, modifications of the unit can be made at low cost and relatively light in weight for one-shot applications, e.g., in the atmosphere or in outer space.

Other objects and features of this invention are more particularly pointed out hereinafter and are evident from my disclosure.

The theory behind laser light generation and stimulated optical emission is now well known in the art, so a detailed theoretical discussion is not deemed necessary here. However, a brief description will be useful for purposes of clarity.

The laser (i.e., often called the optical laser) produces an intense beam of light that is coherent, often further characterized as monochromatic, uniphased and unipolarized across an aperture. The laser operation depends upon the fact that all atomic and molecular systems possess discrete energy levels, i.e., they can store energy in fixed amounts or quanta. These energy levels are different for each system. An atom in its lowest energy state can absorb energy from an electromagnetic wave of the right frequency and make a transition to an excited or upper state. If the atom emits its energy as light, it can either emit a light quantum spontaneously (fluorescence) or it can be stimulated to emit its radiation by a wave of a similar frequency. A laser is so operated that more of the atoms in the active material—here called "laser material"—and the like are excited to the upper state than remain in the lower state. A light wave—here meaning "optical," i.e., those octaves covering the ultraviolet, the visible and the infrared—of proper frequency (or wavelength) stimulates (or "pumps") these excited atoms to emit their excess energy, thus gaining energy itself. The stimulated or pumped emission is in phase with the original wave and so is coherent with it.

The principles of the present invention will be better understood from the following more detailed discussion taken in conjunction with the accompanying drawings, wherein.

Figure 1:
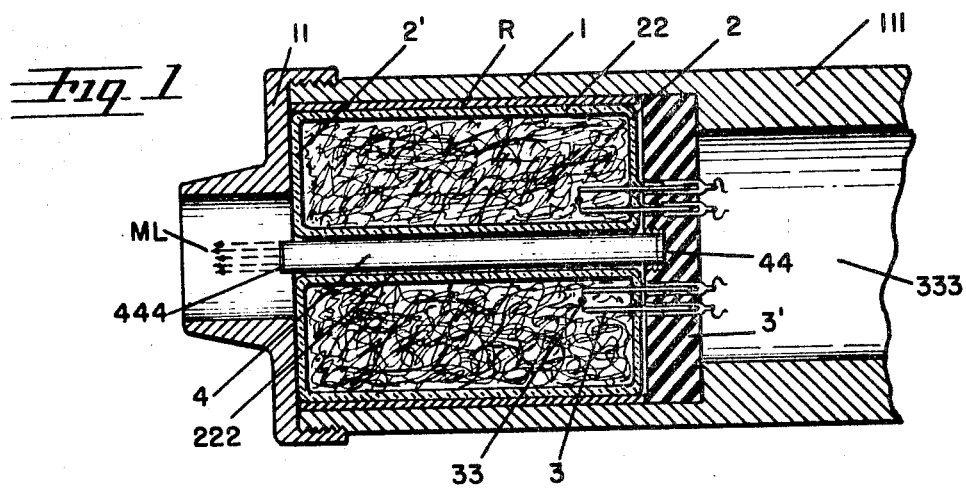
FIG. 1 shows in side-elevation certain of the features which illustratively embody principal elements of my chemically pumped laser light generator and chemical cartridge for the pumping thereof.

In more detail:

Referring now to FIG. 1, there is shown a housing member 1 of metal or plastic or the like which has on its internal surface a layering of heat and shock insulating material, e.g., fibrous glass, asbestos or the like; an exit end or muzzle 11 of the housing; and a rear or butt end 111 of the housing. Within the housing member 1 is a reloadable chemical pumping cartridge 2 having end walls 2′, an exterior or outer wall 22, and an inner or bore wall 222. R refers to a reflector which may be a separate unit, a mirroring upon the external surface or the internal surface of outer wall 22, as desired. The entire chemical pumping cartridge may be transparent or, minimally, the bore wall 222 is transparent. Introduced into the chamber of the pumping cartridge, preferably at the butt end and proximate to the bore wall 222 in the case of volume-loading or in connection with the mass employed in wall-loading (see subsequent figures and explanations, FIGS. 5 and 6), are seal-in ignition means which include ignition electrodes 3 provided with filament 33 and an optional primer pellet; in turn the ignition means affix into and through a permanent base plate 3′ of dielectric plastic or the like, being circuited into the circuitry and battery or like firing means carried in area 333.

Further in FIG. 1: It is now seen that the chemical pumping cartridge comprises the female of an assembly the male of which is a laser rod 4 optically coupled with said cartridge at the bore wall 222; this coupling may be achieved by contour finishing of each of the respective surfaces or by the use of a medium such as silicone. The laser rod 4 is affixed into base plate 3′ so that it also is reloadable, rod member 4 being provided with say 100% opacity mirroring at the butt end 44 and semi-mirroring for the exit of laser light ML via the exit end 444, details of which are set out hereinafter.

Figure 2:
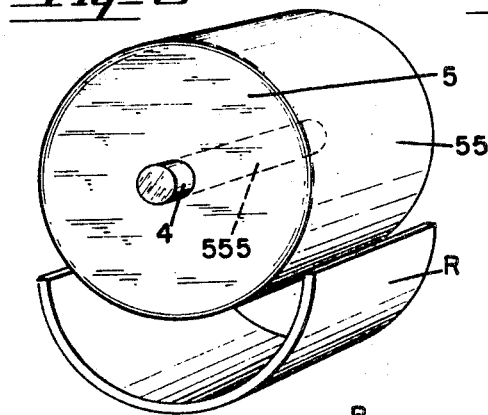
FIG. 2 shows in perspective a laser rod 4 and a female pumping cartridge equipped with a light reflector R.

FIG. 2 shows in perspective certain of the details of the male laser rod member 4 and the female chemical pumping cartridge comprised of end walls substantially of or slightly less than the length of the rod 4, shown as 5, with the aforementioned bore wall 555 optically hugging rod 4, and an external wall 55; the reflector member is shown again as R. FIG. 2 is a reloadable, non-segmented pumping cartridge adapted to slip into place over the laser rod 4.

Figure 3:
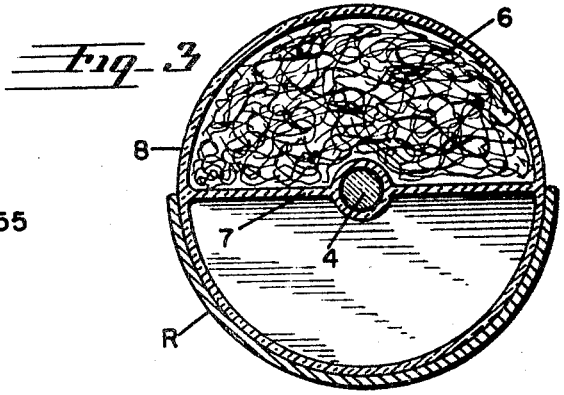
FIG. 3 shows in end-elevation another laser pumping cartridge, in this modification longitudinally bisegmented.

FIG. 3 shows a longitudinally bisected or hemicylindrical pumping cartridge 6 wherein 7 is a side wall thereof and 8 is an outer wall thereof.

Figure 4:
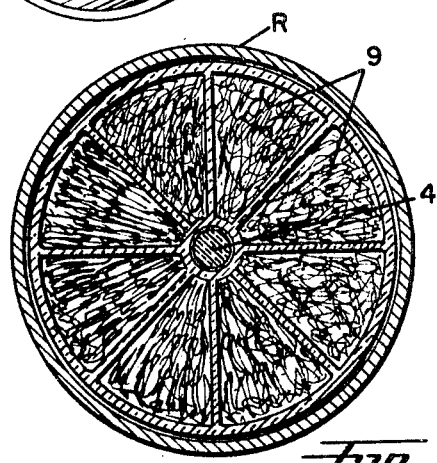
FIG. 4 shows in end-elevation another laser pumping cartridge, in this modification longitudinally multisegmented.

FIG. 4 shows in end-elevation a multisected or segmented chemical pumping cartridge wherein 9 depicts the segments thereof.

Figure 4A:
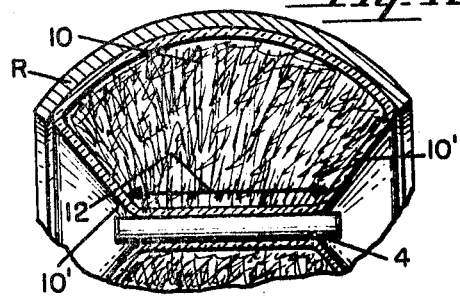
FIG. 4A shows in side-elevation an embodiment having parabolic or like configuration for enhanced pumping qualities.

FIG. 4A is like FIG. 1, except that it is provided with pumping light conserving means, namely a parabolic or like member or configuration 10 which may be the outer wall of the pumping cartridge suitably mirrored or provided with a parabolic reflector R of suitable contour; in FIG. 4A the end walls 10' may angle out. Likewise, in this or like assemblies the laser rod 4 is set with 12 which is the "focal point" of the parabolic element with reference to the length of the rod 4, equal to or shortly less than the length of rod 4, to be pumped.

Figure 5:
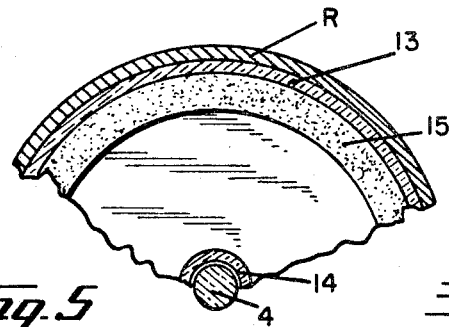
FIG. 5 shows in end-elevation wall-loading of a pumping cartridge with light-producing chemical reactive.

FIG. 5 shows wall-loading of the pumping cartridge chamber having an outer wall 13 and a bore wall 14, all in side-elevation; affixed to the outer wall 13 is a layer or mass of light-producing chemical composition 15 which is in ignitible contact or connection with the ignition electrodes and firing means, as for example shown in FIG. 1 and further detailed hereinafter.

Figure 6:
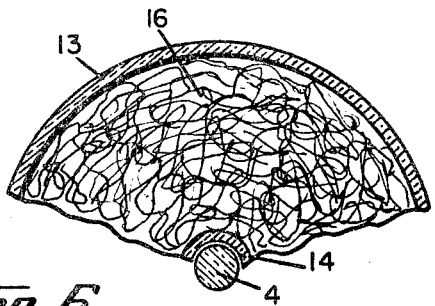
FIG. 6 shows in end-elevation volume-loading of a pumping cartridge with light-producing chemical reactive.

FIG. 6 shows volume-loading of the pumping cartridge chamber having an outer wall 13 and a bore wall 14, all in side-elevation; the characteristic of material volume-loaded is that it has a high surface to volume ratio, e.g., a material which is particulate, foil, filament, or the like. Depending upon the volume loaded material there may or may not be oxygen present at requisite pressure.

Figure 7:
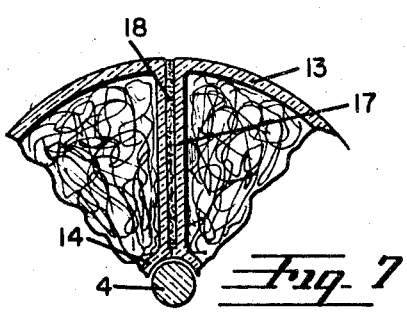
FIG. 7 shows in end-elevation a portion of a pumping cartridge designed for contact ignition and firing of an adjacent cartridge.

FIG. 7 shows in end-elevation the side wall 17 of a segmented or longitudinally multisected pumping cartridge. Interleaved is heat transferring material 18, e.g., of copper, gold, silver or the like.

Figure 8:
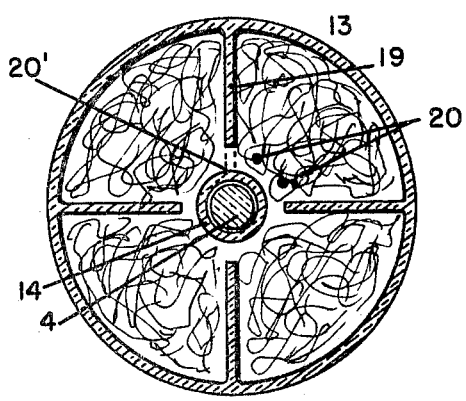
FIG. 8 shows in end-elevation a portion of a pumping cartridge having internal baffle elements to regulate firing of the chemical reactive.

FIG. 8 shows in end-elevation a design functioning the opposite of that depicted in FIG. 7; namely, a firing delay baffle 19 segment interleaf system comprised of baffles 19 affixed to and extending into the region of the cartridge such that the firing at or within one segment-type cartridge by ignition electrodes 20 initiates a sequential, i.e., circumferential firing through the adjacent segmented areas; 20' is an optional back-fire baffle to prevent non-sequential firing.

Figure 9:
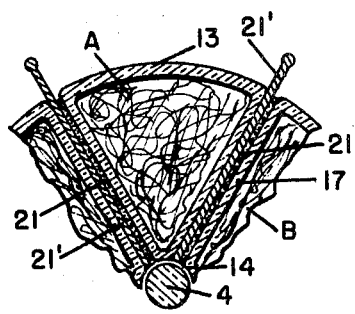
FIG. 9 shows in end-elevation a portion of a pumping cartridge designed to prevent contact ignition of an adjacent cartridge.

FIG. 9 shows in end-elevation a posture similar to FIG. 7 except that its functioning parameter is just the opposite; namely, heat dissipation and heat insulation via interleaf fins 21' and heat insulation interleaves 21, all to prevent contact firing from fired or ignited chemical pump A through to firing or ignition of chemical pump B.

The female chemical pumping cartridge is typically a transparent envelope in the form of a cylinder which may or may not be longitudinally multisected, the female axial bore of which is sufficiently large to permit fitting over the male laser rod, and of radius determined by the type and amount of loading as well as whether the cartridge is segmented. The length at the bore is typically approximately that or slightly less than the length of the male laser rod member. The cartridge is typically a transparent envelope of glass, fused silica, or the like having reflection means proximate to its external wall. The reflection means can be an external metal reflector mirrored on the outer surface of the external wall of the cartridge, a mirroring upon the inside wall thereof, or a separate reflector element say mounted around the internal housing wall. The cartridge carries two electrical contacts or ignition electrodes preferably entering the butt end of the member and preferably proximate to the bore wall in the case of volume loading or proximate to the interior surface and thus relatively proximate to the bore wall in the case of wall loading. With volume loading the interior of the cartridge is loosely filled with a mass of fine metal wire, foil, particulate or the like, or equivalent composition, which may be in an atmosphere of say oxygen at reduced pressure. With wall loading the wire filament and primer of the ignition electrodes connect with the layer of light-producing solid carried on the inside outer wall of the cartridge.

While FIG. 1 depicts the pumping cartridge as having a bore wall and an outer wall substantially parallel to each other, it is evident that this cylindrical, parallel wall configuration is not limiting and, in fact, in certain modifications non-parallel geometry may be desired (FIG. 4A). Thus while the bore wall may be of contour to optically hug and therefore couple and fit to the surface of the laser rod member, the outer wall of the pumping cartridge may be parabolic and set out by the end walls at a distance such that the laser rod falls linearly into the focal plane of the parabola such that pumping light strikes uniformly along the length of the laser rod (FIG. 4A). This configuration provides for both greater amounts of volume loading and wall loading, as the case may be. Depending upon the amount of light-producing material and the loading the energy output and the pumping period can vary upwards from several tens of microseconds at readily attained pumping values ranging upwards from several tens of thousands of joules.

The laser rod 4 is typically a doped solid; in addition the choice can be from fluids such as gases and vapors which are mixed or pure, as for example potassium vapor maintained at a temperature of about 435° K. and at a vapor pressure of about $10^{-3}$ millimeters, as well as other alkali metals; likewise, mixtures of helium and neon, for example, can be employed, as is well known in the art. These are contained, as would be liquid laser materials, within suitable enclosures generally characterized as having transparent sides and optically finished and mirrored ends as set out herein.

Examples of solid laser materials include the better known synthetic ruby ($Al_2O_3$:Cr, emitting at 6943 A.), the various doped calcium fluorides (CaF:U and CaF:Sm), the various doped calcium tungstates ($CaWO_4$:Nd, emitting at 10,650 A.; $CaWO_4$:Tm, emitting at 19,110 A.), and other such as strontium molybdate ($SrMoO_4$:Ne, emitting at 10,634 A.), and the like. Of particular interest in connection with this invention are the suitably doped rigid organic glasses, such as naphthalene doped with a benzophenone; with these systems a very wide range of wavelengths of output laser light ML can be had; in addition they are readily made at low cost. Moreover, composite laser rods can be used in this invention, as for example ruby covered with a coaxial sheath of transparent, refractive material like sapphire, the pumping light being refracted within the sheath and increasing the intensity at the active laser core, also facilitating cooling by providing an increase in surface area; as well as a core of one kind of laser material having a coaxial sheath of another kind of laser material, the sheath being transparent to and not pumped by light which pumps the core portion and the sheath being pumped by light of other wavelengths present in the pumping light that otherwise would go to waste in the process.

As an example using chromium doped aluminum oxide crystals as the laser rod, it is typical to have pumping light intensities generated by the cartridge of the order of 100 megalumens peak to assure good performance, with flash durations of say of the order of 100 microseconds. This is readily attained by volume-loadings of from several tens to several hundreds of grams of light-producing metal foil or filament. A substantial margin in loading mass should be allowed to compensate for the more effective pumping wavelength of about 5600 A. in the case of ruby and the uranium and samarium doped calcium fluorides. As will be evident to those skilled in the art, these relationships and figures are only illustrative and are set out for the aid of those skilled in the art, it being obvious that wide variation accruing from varying choices of laser rod material and results desired.

The two ends of the laser rod may have various configurations and mirrorings, a number of which are well known in the art. Thus the simplest are optically plane, parallel ends, the butt end of which in this invention is mirrored for 100 percent opacity and the exit end of which is mirrored to a typically 1 to 1.5 percent transmissivity. The mirroring may be as high as 8 to 10 percent on the exit end, depending upon the modification. Silver, gold and other metalizing materials can be used. Thus for infrared waves a coating of gold is typically about 500 A. thick on the exit end surface, showing 1 percent transmissivity, 2 percent absortivity and 97 percent reflectivity.

Likewise, multilayer coatings consisting of a series of thin dielectric films made alternately of materials with high and low refractive indices provide reflection coefficients up to 99.9 percent with very low absorption. Multilayer coatings are preferred and advantageous because they do not absorb heat and therefore do not burn up, thereby permitting a higher pumping energy input; moreover, they are durable and can be cleaned by gentle washing.

Instead of flat and parallel ends convex ends can be used, as in the case of rods of the tungstates and molybdates. The butt end of the laser rod may be ground and polished and subsequently mirrored in the form of a fresnel mirror, in which case the exit end is plane.

While round or cylindrical laser rod geometries are generally preferred, not excluded from the present invention are rods which are square, triangular, pentahedral, or of like geometries. In these versions the mirrorings described previously can be used or, as in the case of a square laser rod, the butt end is fabricated to a dihedral reflector. According to the form of the present invention, non-round laser rods have certain advantages. Thus with a triangular rod each surface face has a matching pumping segment for a total of three such 120° segments through 360°; likewise, for a square rod each surface face is coupled to the bore wall of one of a total of four such 90° cartridge segments through 360°; and so on. It will be noted that these rod geometries are adapted to the production of laser light beams which, in cross-section, may have square, triangular, octagonal, star-shaped, or other form, to which they may be applied to specialized requirements.

Examples of light-producing chemical reactives include metal and metallic powders, pastes, filaments, foils, and the like. Thus, aluminum, magnesium, and zirconium, are suitable choices. Magnesium filament, for example, is adapted to pumping upwards from approximately 250 watts (electrical equivalent), at a very conservative minimum, and with large versions of the pumping cartridge upwards from approximately several hundred kilowatts (electrical equivalent) are readily attained with other metals.

In addition to metals and metallics and certain of their hydrides, e.g., zirconium hydride, various mixtures can be used for loading the pumping cartridge. For example, an admixture of parts-by-weight of the following, all finely powdered: zirconium (28), zirconium hydride (7), magnesium (7), barium nitrate (30), barium oxide (25), and rice starch (5); roughly equal parts of magnesium powder and an oxidizing agent (e.g., alkali chlorate or alkali dichromate, or ammonium or alkali nitrate); a mixture of alkali perchlorate (20), alkali chlorate (39.5), silver nitrate (39.5), and nitrocotton (1.0). Additives which emit at selected wavelengths can be employed, e.g., salts of lithium, boron, barium, heavy metals, with these or like light-producing chemical reactive compositions.

It is noted that caution should be employed with the aforementioned mixtures, the pumping cartridge being constructed such that its strength is sufficient with relationship to its charge that it does not explode, rupture or unduly fragment. An overlay of transparent thermoplastic resin or the like adds to the safety feature, as does the shock absorbent housing of the apparatus.

The cartridge firing or igniting means can be simply a dry battery with suitable circuitry and switching adapted to simultaneous firing, sequential firings, or at-will firings of separate pumping cartridge segments. Many versions of this circuitry are well known in the art and need not be detailed here. However and generally for the aid of those in the art, when batteries are used for direct firing of the pumping cartridge they must be capable of delivering several amperes or more, a current sufficient to avoid failure to fire the laser pumping cartridge. To increase the firing current, particularly when pump cartridges are as segments and connected in series, i.e., wired so that that current passes through one segment after another, several batteries can be used; these are connected in series. With the simultaneous firings of all segments the segments may be connected in parallel, and the batteries thus connected in parallel. A capacitor can be used in the igniting or firing circuit to increase voltage when it is needed to fire a non-segmented cartridge or an array of segment-type cartridges characterized as having a high radius to length ratio, e.g., say of the order of several times or more.

While this invention has been set out as operant at ambient temperatures, which temperatures include the supercool of outer space, cooling means can be applied in various ways to the laser rod member. Examples include a hollow, tubular laser rod through the bore of which is ejected a coolant, e.g., introduced at the butt end. The cooling means in this case includes a controllably-valved bottle of coolant, e.g., compressed or liquified gas such as air, carbon dioxide, nitrous oxide, nitrogen; also, carbon dioxide snow (195° K.), slushes of carbon dioxide (solid) and light organic liquids, e.g., acetone and ether (ca. 173–187° K.), methyl chloride (250°) and methyl chloride together with a blast of air (223° K.). Just prior to use the valve is opened and the laser rod cooled by escaping coolant, the chemical cartridge then being fired, with or without the coolant source closed off. Also, fabrication of one of the segments of the pumping cartridge such that it carries coolant and is open at the external wall, e.g., containing carbon dioxide snow-organic liquid slushes. The laser rod may be grooved to allow coolant along its length, as another alternative. Finally, the conventional cold finger and rod surface coolant treatments can be used, as desired and as dictated by the modification and its requirement.

I claim:

1. A transducer system for converting chemical energy into light characterized as coherent which comprises a female laser pumping cartridge adapted to receive a male laser light-emitting member, a male laser member within said cartridge, said female laser pumping cartridge comprising a transparent shock-proof envelope having an interior wall adapted to receive and optically couple to the said male laser member, end walls, and an outer wall arranged cooperantly with reflection means, said reflection means characterized as throwing light through the said female laser pumping cartridge and into the said laser light-emitting member, the female laser pumping cartridge being substantially cylindrical and the male laser light-emitting member being substantially the same length as the said female laser pumping cartridge, the said female laser pumping cartridge being longitudinally multisected into segments, a loading of chemically reactive, ignitible material within said female laser pumping cartridge characterized as emitting light of high intensity and of wavelengths stimulating to the said male laser light-emitting member, ignition electrodes inserted through a wall of the said female laser pumping cartridge and means coupled to the said electrodes for the ignition of the said chemically reactive material.

2. The transducer system as in claim 1 wherein the said longitudinally multisected female laser pumping cartridge is provided with heat-insulating leaves between the said segments to prevent thermal contact ignition of the said adjacent segments.

3. The transducer system as in claim 1 wherein the said longitudinally multisected female laser pumping cartridge is provided with heat-transferring leaves between the said segments to provide thermal contact ignition of the said adjacent segments.

4. The transducer system as in claim 1 wherein the configuration of the female pumping member envelope is such that the interior wall is substantially parallel to the longitudinal axis and substantially follows the surface contour of the said male member, and the outer wall of the said female member is substantially parabolic and the male member lies within the focal portion of the said parabolic such that the male member receives reflected light along its length.

5. The transducer system as in claim 1 wherein the said female pumping cartridge is provided with a shock absorbent housing having an exit characterized as permitting the passage of laser light from the said male laser light-emitting member.

References Cited by the Examiner

UNITED STATES PATENTS

| | | | |
|---|---|---|---|
| 2,191,402 | 2/1940 | Saffir et al. | 67—31 |
| 2,279,880 | 4/1942 | De Margitta | 67—61 |
| 2,929,922 | 3/1960 | Schawlow et al. | 88—1 |
| 3,162,822 | 12/1964 | Tackaberry | 331—94.5 |

JEWELL H. PEDERSEN, *Primary Examiner.*

R. L. WIBERT, *Assistant Examiner.*